J. A. BEVERLY.
RAT TRAP.
APPLICATION FILED SEPT. 3, 1912.
1,105,874.
Patented Aug. 4, 1914.
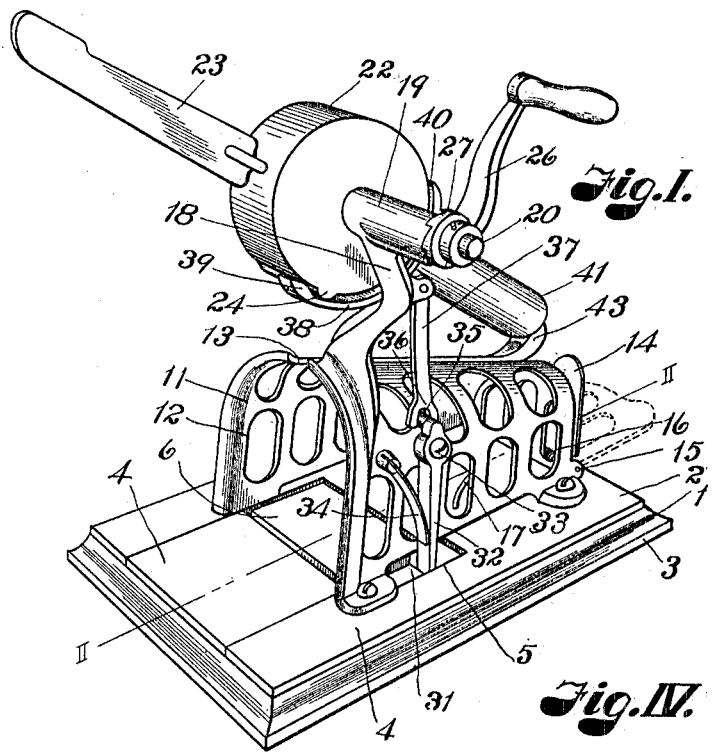
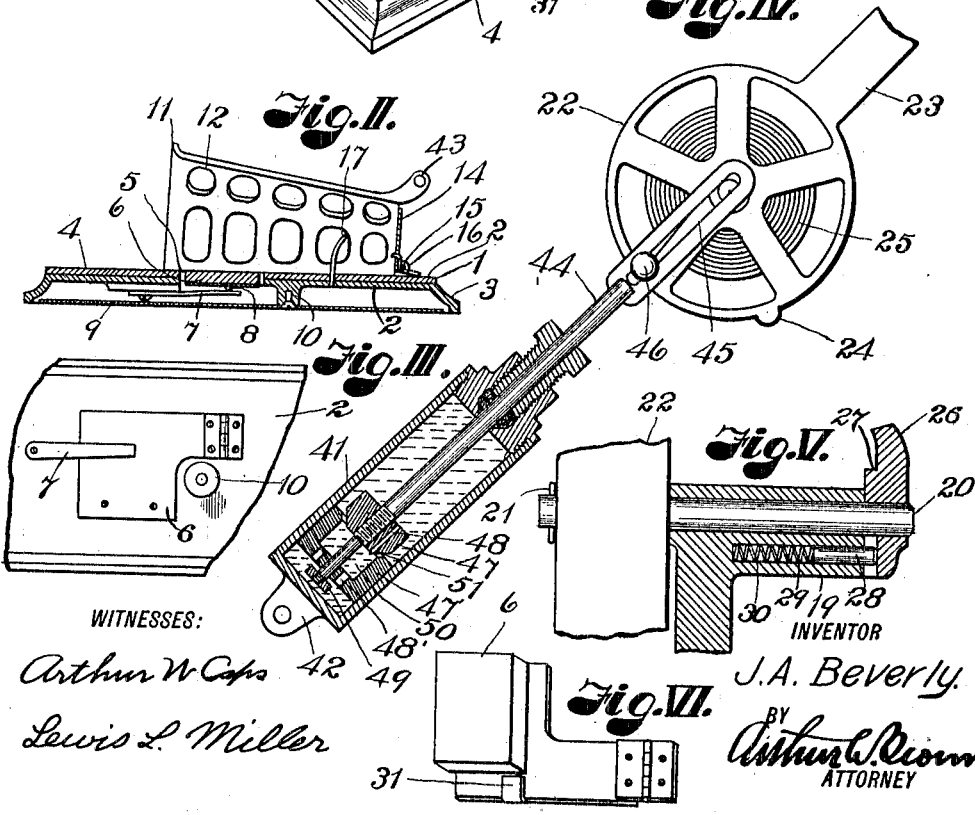
WITNESSES:
Arthur W. Caps
Lewis L. Miller
INVENTOR
J. A. Beverly.
BY
Arthur C. Brown
ATTORNEY

UNITED STATES PATENT OFFICE.

JAMES A. BEVERLY, OF TOPEKA, KANSAS.

RAT-TRAP.

1,105,874. Specification of Letters Patent. Patented Aug. 4, 1914.

Application filed September 3, 1912. Serial No. 718,186.

*To all whom it may concern:*

Be it known that I, JAMES A. BEVERLY, a citizen of the United States, residing at Topeka, in the county of Shawnee and State of Kansas, have invented certain new and useful Improvements in Rat-Traps; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to rat traps, and more particularly to a device of this class comprising a striking arm and an automatic re-setting mechanism whereby the device is adapted for a number of independent actuations.

It is the principal object of the present invention to provide improved arm control and trip mechanism, together with a suitable buffer for retarding the travel of the arm after each blow, and a bait box having openings through which light may pass to the interior of the box. In accomplishing these objects, I have provided the improved details of structure hereinafter described and illustrated in the accompanying drawings, wherein:—

Figure I is a perspective view of a trap constructed according to my invention, the door of the bait box being shown closed in full lines and open in dotted lines. Fig. II is a reduced vertical section of a portion of the same taken on the line II—II in Fig. I. Fig. III is an inverted plan view of a part of the base, showing the trip. Fig. IV is a detail view of the arm hub and dash pot, the latter being in longitudinal section. Fig. V is a sectional view of the crank shaft bearing and ratchet. Fig. VI is a detail view of a part of the trip base, showing the trigger boss.

Referring more in detail to the parts:— 1 designates the base of the trap which is preferably composed of cast metal and comprises a top plate 2 and edge flanges 3; the latter being adapted to support the top plate above the floor so as to leave space for mounting the trip base, presently described. The top plate has an overlay 4, of wood, or other suitable material, and near the center of the plate and overlay is an opening 5. Hinged to the base of the plate and projecting into the opening is a trip 6 which is yieldingly supported on a level with the base plate by a spring 7, and has an overlay of wood to correspond with the top of the base plate, the trip base fitting snugly into the opening 5, but being adapted for free vertical movement relative thereto when pressed from above. In order to facilitate the vertical movement, I preferably provide the bottom of the plate with a lug 8 against which the spring 7 is adapted to bear to provide a knife-edge contact and reduce friction of the plate against the spring when the former is rocked. In order to protect the trip, I preferably provide the base with a bottom cover 9 which may be fixed to the flanges 3 in any suitable manner, but preferably by screwing the cover onto a lug 10 which depends from the bottom of the base plate.

Fixed to the top of the base is a bait box 11 comprising a tapered body, preferably of cast metal, and having openings 12 therein through which light is admitted to the interior of the box, the openings being as large as possible, so that a maximum amount of light may be admitted without unduly exposing bait contained in the box. The box is preferably formed in two separate pieces in order to provide a longitudinal slot 13 in the top through which the striking arm, presently described, may strike; the large end or mouth of the box being located over the trip plate and the small end of the box being equipped with a door 14 which is axially mounted on a pin 15 carried by the box and yieldingly held in closed position by a spring 16, the door abutting against the end of the box when closed so that no access is afforded to the interior of the box through the small end thereof except when the door is swung back against the tension of its spring.

Fixed on the base 2 between the trip 6 and door 14 are hooks 17 to which bait may be attached.

Rising from the forward portion of the bait box is a standard 18 having a bearing 19 at its upper end within which a shaft 20 is revolubly mounted, the ends of the shaft projecting from both ends of the bearing, the standard being offset so that the inner end of the shaft may terminate in substantially the vertical plane of the slot 13 in the top of the bait box and leaving space between its end and the end of the bearing.

Revolubly mounted on shaft 20 between the end of the bearing and a key 21 on the end of the shaft is a drum 22 having a striking arm 23 projecting radially from its outer edge and having a transverse rib 24 on its periphery rearwardly of the striking arm, the rim of the drum, with the striking arm and rib, being preferably cast integral and fixed rigidly to the drum sides.

Wound on the shaft 20, within the drum, with one end fixed to the shaft and the other to the rim of the drum, is a spring 25 which is adapted to tension the drum forwardly so that when the drum and shaft are revolved the striking arm will be carried rapidly around through the slot in the bait box, so that it may strike the head or forequarters of a rat standing with its forefeet on the trap 6. In order to tension the spring 25 and hold the same under tension, I provide the shaft 20 with a crank 26, having an inwardly facing ratchet collar 27 adapted for coöperation with a plunger 28 which is slidably mounted in a pocket 29 in the under side of the bearing 19 and yieldingly tensioned outwardly to operative position by a spring 30. It is apparent that with this arrangement the shaft may be revolved forwardly to tension the main spring, but is held against backward movement, the ratchet pushing the pawl back against the tension of the spring when moved forwardly, and the shoulders of the ratchet catching against the pawl when the crank is moved backwardly.

At one end the overlay on the trip base is cut away and the metal bottom provided with an upturned boss 31 which is adapted for engagement by the end of a trigger 32 pivotally mounted on a pin 33 on the side of the bait box, such trigger being yieldingly tensioned away from the boss by a spring 34 also carried by the side of the box. The upper end of the trigger 32 has an inturned stud 35 which projects into a yoke 36 on the lower end of the depending arm 37 of a latch 38, the forward arm of which has a boss 39 on its end adapted for projection in front of the boss 24 on the arm drum to hold the drum against the tension of its spring, the engaging faces of the bosses 24 and 39 being inclined so that when the trigger is released the tension of the main spring will move the drum boss against the lever boss and rock the lever against the tension of the spring 34 to release the drum. I preferably provide the latch 38 with a rear arm 40, and curve the arms 38 and 40 around the drum, so that when the lever is rocked in either direction the arms will stop against the drum and limit the pivotal movement of the lever.

In order to cushion the striking arm after it has performed its function and so that it will again relock without striking with its full force against the stop lever, I provide a dash pot 41 having its lower end 42 pivotally mounted on an arm 43 at the rear end of the trap, and having a rod 44 provided with a slot 45 through which a pin 46 on the spring drum is projected, the parts being so arranged that the pin will slide freely through the rod slot during the initial travel of the striking arm, will extend the rod as the arm approaches its striking position, and will force the rod back into the dash pot as the arm completes its revolution, in order to force the piston backwardly against the cushioning medium within the cylinder; the piston having relatively large and small valve ports for affording free outward movement and retarded inward movement so that it may resume its set position without undue shock or danger of breaking the stop boss or lever. I prefer to fill the dash pot with a liquid agent and provide a double piston 47—47', the part 47 being fixed on the rod 44 and provided with a small aperture 48 through which the fluid may pass slowly from one side of the piston to the other, and the member 48 being slidably mounted on the inner end of the rod and provided with one or more large apertures 48' through which the fluid may pass rapidly. The member 47' is held on the rod by a nut 49 and has a chamber 50 with which the aperture 48 of the member 47 communicates, and a seat 51 for the member 47, so that when the member 47 is pushed against the member 47' the only passage for fluid to the top of the dash pot is through the aperture 48. The member 47 is of less diameter than the member 47', so that when the rod is pulled outwardly fluid may flow around the member as well as through the small aperture 48 and move with relative freedom within the pot.

Presuming the parts to be constructed and assembled as described, the trap is baited through the small end of the box and the main spring tightened by revolving the crank 26. When the trap is set in this manner, should a rat attempt to reach the bait through the open mouth of the box, it must depress the trip base 6 and release the lower end of the trigger 32. When the trigger 32 is released from the trip base, the tension of the main spring pushes the drum boss 24 past the boss on the trigger lever, which latter is allowed to rock by the release of the trigger and throws the drum and striking arm around rapidly, the striking arm passing through the slot in the bait box and striking the rat a killing blow. The blow of the striking arm not only kills the rat but it throws the same out of the trap so that when the arm is re-set and another rat attempts to reach the bait the killing operation may be repeated. Before the arm has struck, the pin 46 engages the outer end of the dash pot rod and pulls the rod so that the sliding piston member is spaced from the fixed member and the fluid allowed to pass around the fixed member and through the large apertures in the sliding member to the inner end of the pot. After the arm has struck the pin is carried around until it engages the inner end of the slotted portion of the piston rod and forces the rod inwardly, forcing the fixed piston member to its seat in the sliding piston member, so that the fluid must pass through the small valve aperture to reach the outer end of the pot, thereby cushioning the arm, so that as it approaches its set position it is retarded on account of the retarded travel of the piston, and the boss on the spring drum comes gently into contact with the boss on the trigger lever, the latter having been returned to its set position by the spring 34 as soon as the drum boss has passed. It is apparent that the number of actuations of the striking arm is limited only by the strength and tension of the main spring, and that after the trap is once set it will continue to operate automatically until the spring has run down.

Having thus described my invention, what I claim as new therein and desire to secure by Letters-Patent, is:—

1. In a rat trap, the combination with a supporting base, of a bait box mounted on the base, a standard on the bait box, a shaft revolubly mounted in said standard, a drum revolubly mounted on the shaft and provided with a striking arm, a spring connecting the shaft and drum, trigger mechanism for holding the drum against the tension of the spring, a trip for releasing said trigger, a pivotally mounted dash pot, a pin on the drum, and a piston rod projected into the dash pot and having a slotted end connected with said pin whereby part of the travel of the piston rod is cushioned, substantially as set forth.

2. In a rat trap, the combination with a spring actuated striking arm, of a dash pot comprising a cylinder, a rod slidable in said cylinder and having sliding connection with the striking arm, a piston head comprising a member slidable on the rod, and a member fixed on the rod, said members having relatively large and small apertures, and trigger mechanism for controlling the striking arm.

In testimony whereof I affix my signature in presence of two witnesses.

JAMES A. BEVERLY.

Witnesses:
O. S. Morrow,
H. N. Gaines.

---

Copies of this patent may be obtained for five cents each, by addressing the "Commissioner of Patents, Washington, D. C."